No. 735,501. Patented August 4, 1903.

UNITED STATES PATENT OFFICE.

CHARLES A. HARP AND JOHN F. STARKWEATHER, SR., OF STOCKTON, CALIFORNIA, ASSIGNORS OF ONE-HALF TO GEORGE MARKS, OF SACRAMENTO, CALIFORNIA, AND BEN DAVIS, W. A. MORRIS, AND JOHN F. STARKWEATHER, JR., OF STOCKTON, CALIFORNIA.

PROCESS OF EXTRACTING GOLD AND SILVER FROM ORES.

SPECIFICATION forming part of Letters Patent No. 735,501, dated August 4, 1903.

Application filed May 6, 1902. Serial No. 106,198. (No specimens.)

*To all whom it may concern:*

Be it known that we, CHARLES A. HARP and JOHN F. STARKWEATHER, Sr., citizens of the United States, residing at Stockton, in the county of San Joaquin, State of California, have invented certain new and useful Improvements in Processes of Extracting Gold and Silver from Their Ores, of which the following is a specification.

This invention relates to a mode of treating gold and silver ores containing sulfur, arsenic, copper, lead, zinc, antimony, or iron, and has for its object the disengaging of the precious metal from its gangue or the non-metalliferous portions of the ore, as well as from the metals and minerals which it is not desired to specifically disengage and which it is intended to discard, and has for its object the rendering of a process more thorough, expeditious, and cheaper.

The ore under process of treatment is first pulverized to a degree that the same will escape through a sieve of the dimensions of forty meshes to one inch. We then mix with the same kaolin, brick-dust, saltpeter, unburned limestone, sawdust, and charcoal in substantially the following proportions to one ton of the entire body of ore under treatment, to wit: kaolin, four hundred pounds; brick-dust, three hundred pounds; saltpeter, five pounds; unburned limestone, five pounds; sawdust, five pounds, and charcoal, three pounds. The mixture is subjected to a low heat not to exceed a dull red and while under treatment is to be constantly stirred in order that there may be a free circulation of air until whatever sulfur may be contained in the ore has disappeared.

The chemical action of the component parts contained in the ore under treatment in connection with the above added ingredients has the effect to reduce the base metals to oxids and of destroying the shell which incases the small particles of gold and silver, thus setting these latter free and in a suitable condition for ready amalgamation.

The quantities of the ingredients above described of course may be increased or decreased, according to the character of the ore under treatment.

We have described in general terms, as above, our process and the several ingredients; but describing now specifically and in detail the best method of which we are at present aware of carrying out our invented art we take the rock pulverized, as above described, or "concentrates" in a dry powdered state and mix it with kaolin or brick-dust, or both, in such proportions as is deemed necessary after the examination of the pulverized rock or concentrates to determine the amount of earthy matter already in such ore or concentrates.

For illustration, the amount of kaolin or brick-dust, or both, would be increased or decreased in proportion to the amount of earthy matter already in the ore or concentrates. If the ore to be worked contains a high percentage of iron pyrites, for illustration, kaolin or brick-dust, or both, and niter would be used. If the ore to be worked is composed of numerous bases—such as copper, iron, antimony, and other bases almost free from earthy matter—we would use about one-fifth the weight of ore of kaolin, together with about half the bulk of ore and kaolin of green sawdust. Should the ore contain a large percentage of arsenic, a small amount of limestone would be used. The mixture of ore and ingredients is then put into an oven previously heated to a dull-red heat. The oven must have sufficient openings to allow a good supply of air to pass over the ore. When the mass of ore and ingredients has been evenly distributed over the bottom of the oven, it is allowed to remain undisturbed until the mass becomes a dark cherry red and until the ingredients used have had a chance to contribute their service to the gases, which seem to form a chemical combination to oxidize and desulfurize the ores being worked. Then we stir the mass almost continuously until the bright sparks on bottom of the oven are extinguished and the smell of sulfur has entirely disappeared and the ore has what is termed a "sweet" smell. Soon after the mass has been put in the oven it becomes very thin and slushy and usually remains so until most of the sulfur has disappeared, when it begins to get heavy and "dead." Should the sulfur not disappear within a reasonable time after the mass becomes heavy and dead, we add a little more kaolin or brick-dust, which revives the mass, making it thin and slushy again. This hastens the departure of the fumes, and the mass quickly deadens again as soon as the sulfur has disappeared.

No general rule, as before stated, can be laid down as to quantities of ingredients to be used, as the action of the ore while being roasted must be the sole guide of the roaster. In some ores where a strong carbonic-acid gas is needed charcoal can be economically used; but the charcoal may be dispensed with in roasting many ores, as may also the limestone; but the use of both charcoal and limestone are beneficial in many instances. The chief office of the limestone aside from its usefulness in roasting ores is the service it performs toward rendering the values more susceptible of amalgamation by decomposing when put in water the thin transparent coat usually left on the values by the departure of the sulfur and arsenic. It also decomposes the chlorid and bromid of silver, changing them to metallic silver.

It may be here generally stated that either kaolin or brick-dust is used in all ores, the object being to furnish an absorbent or cupel for the fine gold and an absorbent for the various salts contained in the ore. In some ores brick-dust is preferred to kaolin, being more neutral—that is, without the presence of alumina, silica, and potash.

Niter is used with such ores as require a powerful oxidizing agent, but not in immediate connection with sawdust or charcoal, which must be used prior to and exhaust their functions before the niter is introduced, as charcoal is employed as a reducing and desulfurizing agent, but in many ores may be dispensed with.

Sawdust, among other purposes, is used for the purpose of making the body of ore more porous or aerating it, so that it will give off hydrogen and oxygen at the time the various gases and fumes are beginning to leave.

We have made a test of our process frequently upon a class of ores in which the use of all the ingredients are either necessary or beneficial to some degree, although in ore not of an extremely rebellious nature the use of charcoal and limestone may be dispensed with. In recent tests of extremely rebellious ores we have used our ingredients in the following manner and proportions with marked success.

When the oven is sufficiently heated, as above shown, we place therein a mixture of ore, kaolin, brick-dust, limestone, sawdust, and charcoal in substantially the proportions as hereinbefore stated, and as soon as these several ingredients have exhausted their force and have performed their functions, as before stated, we have added the saltpeter in substantially the proportion as hereinbefore stated with the results claimed.

What we claim as our invention, and desire to secure by Letters Patent, is—

1. The art or process of treating ores, containing precious metal, which consists in pulverizing the ores in the degree above described adding thereto kaolin, brick-dust, unburned limestone, sawdust and charcoal in substantially the proportions hereinbefore stated, agitating the mass and subjecting the same to a proper degree of heat, and when the above-named added ingredients have performed their functions, then adding saltpeter in substantially the proportions specified, all substantially as herein described.

2. The method or process of treating "concentrates," which contain precious metals, consisting in heating the oven to a proper degree, placing therein "concentrates," kaolin, brick-dust, unburned limestone, sawdust and charcoal in substantially the proportions specified and as required, stirring the mass continuously and subjecting the same to a proper degree of heat until the sulfur has disappeared, then adding saltpeter in substantially the proportions specified, all substantially as herein described.

In testimony whereof we affix our signatures in presence of two witnesses.

CHARLES A. HARP.
JOHN F. STARKWEATHER, Sr.

Witnesses:
JOSHUA B. WEBSTER,
CORA SPERRY.